United States Patent
Kenady

(10) Patent No.: US 7,607,864 B2
(45) Date of Patent: Oct. 27, 2009

(54) BUOYANT BUILDING FOUNDATION

(76) Inventor: Stephen Michael Kenady, 5319 Cedar Ridge, Sedro Woolley, WA (US) 98284

( * ) Notice: Subject to any disclaimer, the term of this patent is extended or adjusted under 35 U.S.C. 154(b) by 366 days.

(21) Appl. No.: 11/424,164

(22) Filed: Jul. 20, 2006

(65) Prior Publication Data

US 2007/0166110 A1    Jul. 19, 2007

Related U.S. Application Data

(60) Provisional application No. 60/759,858, filed on Jan. 17, 2006.

(51) Int. Cl.
E02D 27/32 (2006.01)
(52) U.S. Cl. .................... 405/229; 405/196; 52/169.9
(58) Field of Classification Search ............. 405/195.1, 405/196, 200, 218–221, 229; 52/169.9
See application file for complete search history.

(56) References Cited

U.S. PATENT DOCUMENTS

| | | | |
|---|---|---|---|
| 2,715,756 A | 8/1955 | William | |
| 3,166,037 A | 1/1965 | Otis | |
| 3,667,239 A * | 6/1972 | Mott | 405/202 |
| 3,792,538 A * | 2/1974 | De Groot | 405/196 |
| 4,106,146 A | 8/1978 | Maari | |
| 4,343,570 A * | 8/1982 | Myer, II | 405/229 |
| 5,125,769 A | 6/1992 | Lee et al. | |
| 5,131,109 A | 7/1992 | Grip et al. | |
| 5,347,949 A | 9/1994 | Winston | |
| 5,647,693 A | 7/1997 | Carlinsky et al. | |
| 5,775,847 A * | 7/1998 | Carlinsky et al. | 405/229 |
| 5,904,446 A * | 5/1999 | Carlinsky et al. | 405/229 |
| 6,050,207 A | 4/2000 | Mays | |
| 6,293,734 B1 | 9/2001 | Thomas et al. | |
| 6,347,487 B1 | 2/2002 | Davis | |
| 7,293,939 B2 * | 11/2007 | Abbott et al. | 405/196 |

\* cited by examiner

*Primary Examiner*—Frederick L Lagman
(74) *Attorney, Agent, or Firm*—Dwayne E. Rogge; Hughes Law Firm, PLLC

(57) ABSTRACT

An anchor system for a structure which experiences periodic buoyancy situations. The anchor system has a member connected at one end to a foundation and the other end to the buoyant structure. The member restricts movement of the buoyant structure in the transverse and longitudinal directions. The system allows the buoyant structure to move vertically between an upper and lower limit.

31 Claims, 13 Drawing Sheets

BUOYANT BUILDING FOUNDATION

RELATED APPLICATIONS

This application claims priority benefit of U.S. Ser. No. 60/759,858, filed Jan. 17, 2006.

BACKGROUND OF THE INVENTION a) Field of the Invention

This concept relates to a building foundation system to protect houses and other building structures from floodwaters through buoyancy. The system relates to the structural support of the built environment and deals with buildings and structures located within flood plains, hurricane zones, marinas, tidal regions, or other areas where the levels of water rise and fall due to environmental changes such as seasonal changes or storm events.

b) Background Art

U.S. Pat. No. 2,715,706 (Richard) discloses a floatable flood resistant building; the building may be prefabricated or regular construction. Air tanks are positioned below the floor joists and a separator acting as a gasket is positioned between the air tanks so that they do not damage one another. Guideposts in the form of rods or pipes are threaded to the frame of building said upwardly through the floor in between the inner and outer parts of the wall. Flexible connections are provided on the guide rods or posts to avoid snapping the rods during flotation of the building due to side sway.

U.S. Pat. No. 3,166,037 (Otis) discloses a series of flotation and structural units and building structures. Referring to column 2 at line 45, a floating boat house structure has three laterally spaced walkways which are connected at the rear portions by transversely extending modules. Each walkway is formed of a plurality of rectangular flotation units. Referring to column 3 at line 19, each module is made of a rigid metallic frame. The frame is embedded in and surrounded by expanded plastic substrate. The substrate makes the frames buoyant due to the watertight covering.

U.S. Pat. No. 4,106,146 (Maari) discloses a connecting arrangement between a floating structure and an anchor, where the arrangement includes an upwardly extending rigid bar or rod connected at the base for vertical swaying movement about two perpendicular horizontal axes to the anchor. Thus the vertically aligned bar can swivel 360° and change from a vertically aligned direction to an angularly aligned position. At the upper end, the rod is connected to links which are connected to arms that are pivotally connected at a plurality of points to a floating platform.

U.S. Pat. No. 5,125,769 (Lee) discloses a floatable structure for floating on an ocean surface which is fixed relative to the ocean bottom. A plurality of submersible caissons and a floating box girder capable of supporting a modular superstructure are used as the foundation.

U.S. Pat. No. 5,131,109 (Grip) discloses a pontoon bridge with automatic height adjusting and locking systems, the bridge has a superstructure supported by pontoons, each end of the bridge is affixed to the bottom by anchors and anchor cables which are clamped to the expected maximum load by means of sinkers and sink cables. The anchor cables and sink cables are wound in pairs and unwinding the anchor cable winds up the sink cable and vice versa.

U.S. Pat. No. 5,347,949 (Winston) discloses a landlocked floating house, which is a modular housing unit designed for flood water prone areas, factory built, utilizing wooden post tension frame construction. A sheathed modular solid foam float resides at the underside of the housing unit. Wooden piers serve as the foundation preceding the flood water conditions. A series of oscillating damping telescoping piers secured permanently to perimeter beams serve as station anchors to keep the house from floating away during flood water conditions.

U.S. Pat. No. 5,647,693 (Carlinsky) discloses a flotation system for buildings; the system has a watertight basement with a single piece of concrete which forms the floor and walls of the basement. Rollers are attached to the basement as the flood waters rise and recede, the rollers telescope guideposts located near the corners of the basement. Attached to the guideposts are ratchet systems for moving the building along the guideposts and maintaining it at a desired height. Guideposts in the current embodiment are vertically aligned I beams and the rollers are arranged so that they are fixed to the concrete basement and roll between the flanges against the web of the I-beam.

U.S. Pat. No. 6,050,207 (Mays) discloses a flood control device for protecting objects such as houses, industrial and commercial buildings, storage vessels, boat moorings, and other structures from rising water or flood waters. Essentially what appears is that the foundation has a series of concrete sub chambers with buoyant floats attached to vertically aligned guide shafts or pistons, the water enters into the concrete chamber and the floats rise due to buoyancy and carry the structure vertically upwards. The structure is supported by the vertically aligned pistons.

U.S. Pat. No. 6,293,734 (Thomas) discloses an apparatus for transporting and installing a deck of an offshore oil production platform, the apparatus has a barge, which is adapted to support a deck, and provides devices for moving the deck. The apparatus includes a support framework for the deck and the framework is adapted to be placed on the barge and includes devices for moving the deck vertically, so that the deck can be extended upwards from the barge and then placed on to the offshore oil production platform.

U.S. Pat. No. 6,347,487 (Davis) discloses a flood resistant building structure, which is floatable so that damage is reduced in the event of a flood. Referring to column 6 around line 28, the structure has a plurality of guideposts which extend vertically from support foundations. Sub floor bracing, as seen in column 6 line 41, is provided to reduce horizontal movement of the building during flood or wind forces. The bracing can take the form of any conventional arrangement known. The support foundations are concrete caissons. The guidepost is embedded into the concrete caisson during pouring of the foundation. A sheeting material encases the flooring structure and seals adjacent and against to the joist and beams to make a watertight compartment or void.

EMBODIMENTS OF THE PRESENT INVENTION

Figure 1:
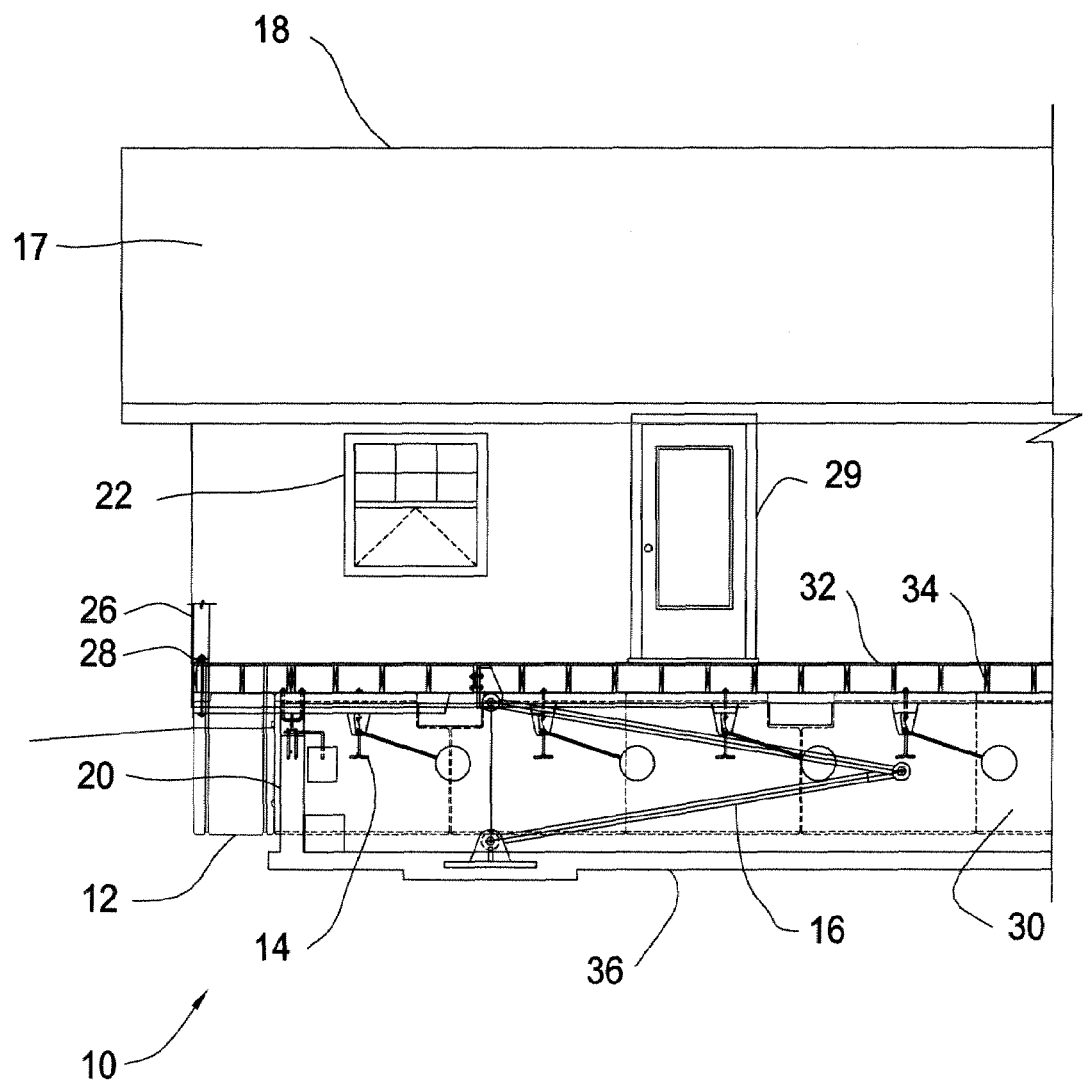
FIG. 1 is a section view of the building float system in its' docked position.

Generally speaking, the present embodiment is designed to anchor a structure which experiences buoyancy properties to a longitudinal and transverse position while allowing the structure to move within a vertical translation range. Some forms of the present concept provide for compensating for buoyancy of the structure through the utilization of floats, while other forms of the present concept integrate the flotation or buoyancy component into the structure itself.

The present embodiment which utilizes the flotation modification has in one form a series of floats placed about the perimeter of the building foundation to provide flotation to the building or structure located within say for example a flood prone region. The floats themselves can be constructed of plastic material, an alloy material, or other watertight structure which provides adequate deadload to buoyancy ratios.

To accomplish the anchoring and flotation, the system is provided in a somewhat modular package which is configurable to various types of structures such as buildings, bridges, houseboats, modular homes, custom homes, commercial buildings, manufactured homes, and the like. For example, manufactured homes can use this package, having the proper specifications to either retrofit an existing manufactured home, or install the package prior to installation of the manufactured home. The system is designed to meet current and/or future FEMA regulations.

While discussion of the anchor system will be provided further below, because much of the immediate applicable use of the anchor system and flotation devices will be for modification in use within flood prone regions, a brief description to provide an understanding of current foundation construction and building practices will now be provided.

For the most part, housing foundations are designed with a perimeter foundation wall having either a strip footing or a basement slab. On a rare occasion, the building will be supported on drill piers or in some cases concrete caissons. At the top of the perimeter foundation wall is a stud wall which has usually a plurality of equally spaced anchor bolts placed about the entire foundation encased within the foundation wall. The anchor bolts extend out of the foundation wall a predetermined distance to accept the bottom plate of the stud wall. The bottom plate is usually pressure treated to avoid water rot and is usually either a 2×4 or a 2×6 laid flat.

The anchor bolts are designed to keep the house from separating from the foundation. For example, when high hurricane force winds or earthquake forces shake the building or provide wind pressure on the side of the building, local and regional building codes require that the anchor bolts be spaced a certain distance apart to provide for adequate building tie downs to the foundation.

Additionally, utilities will mainly extend through the slab or foundation wall and up into the interior portion of the stud wall, providing plumbing, electrical conduit, and other HVAC mechanical services for the operation of the building.

Figure 2:
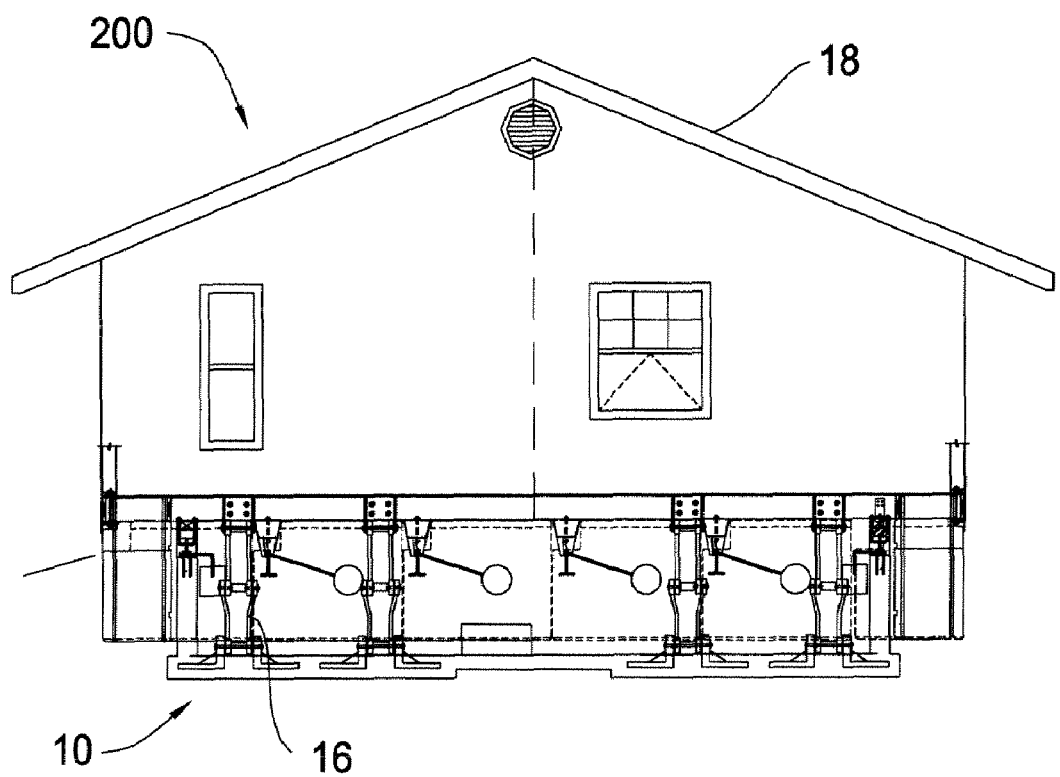
FIG. 2 is a section view of the building float system in its' docked position.

In the present embodiment, the building float system 10 as seen in FIGS. 1 and 2 is positioned substantially in vertical relation to the floor 32 of the building 18. The building anchor system 16 can be positioned below the footprint of the building such as within a crawl space 30, or it can be placed and arranged outside of the building footprint and arranged around the perimeter of the building. The anchor system 16 provides for the control of the building during buoyancy. As will be discussed below, the anchor system 16 will be shown in various embodiments; the embodiments providing a certain amount of vertical and horizontal control over the anchored structure. Examples of such a structure include a building, pier, houseboat, bridge, or other structure exposed to the raising and lowering of water levels.

The building itself has a roof, a window, door, perimeter wall studs 26, bottom plate 28, floor joists 34, which themselves span from perimeter wall foundation 20 to the opposite perimeter wall foundation 20. In this particular embodiment, as seen in FIGS. 1 and 2, within the crawl space 30 is positioned the floating building or buoyant building anchor system 16 which provides for float direction and control of the building as discussed below.

A more detailed discussion of the anchor system in conjunction with the flotation system as applied to a structure which does not have a flotation or buoyancy component built into the structure will now be provided.

The floats 12 are positioned in this embodiment on the outside face of the perimeter foundation 20 and are arranged about the entire perimeter edge of the building. In some situations, the float itself is built into the structure. For example, buoyancy is provided through the normal design of a houseboat, a floating bridge, or providing floats beneath the foundation of the house itself.

In the current embodiment, the building float system 10 is installed below the structure. In order to provide room for the building float system 10 to operate below the first floor 32 of the building 18, a crawl space 30 is provided. This crawl space provides room for the floating building anchor system 16 and the anchor release system 14 to operate. The crawl space 30 uses a building crawl space slab 36 keeping the space relatively cleans from debris and water entrainment. In this current embodiment, the crawl space is approximately 4 feet deep, although the depth will vary depending on the building design.

Each of the main components of the building float system 10 will now be discussed in more detail first starting with the perimeter floats 12, then discussing the anchor release mechanism 14, and the floating building anchor system 16. Lastly, a system operation will be discussed.

Figure 5:
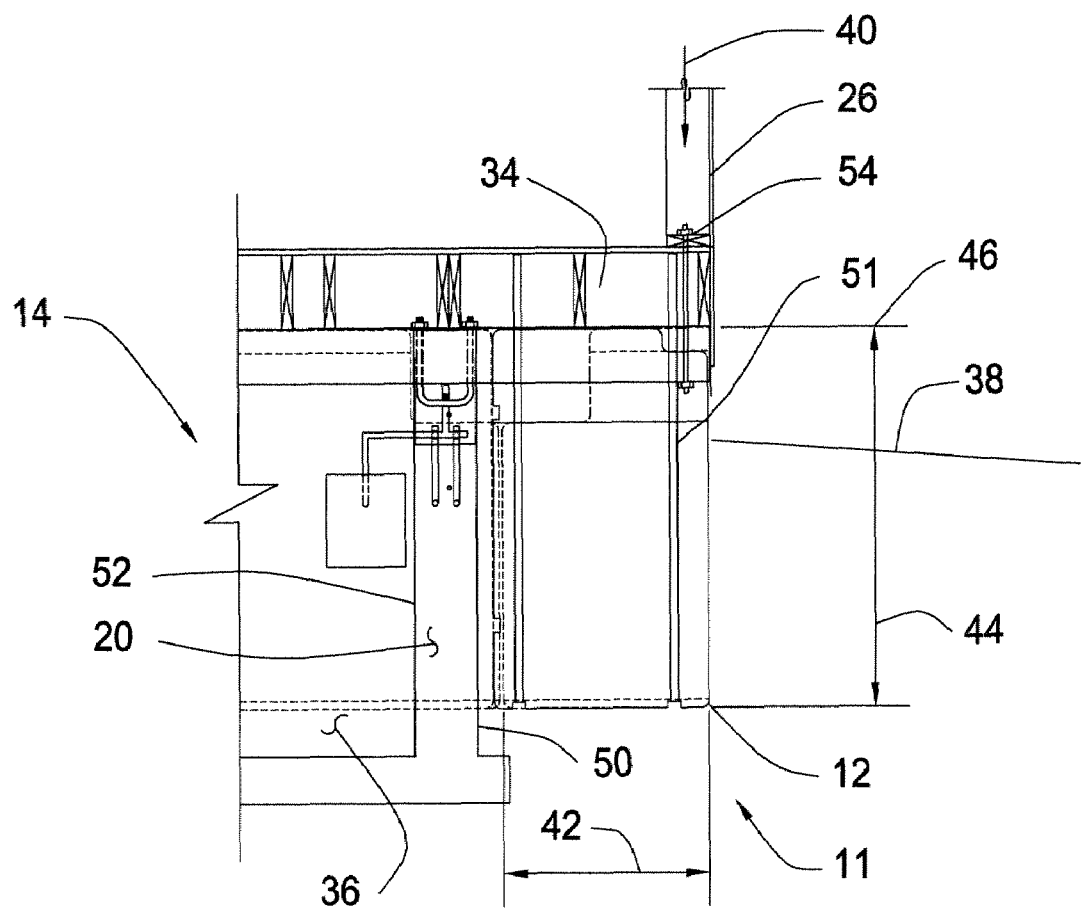
FIG. 5 is a detail section view of the float system at the building perimeter.

One component of the building float system 10 is the perimeter float portion 12 which provides for the flotation of the building during flooding. Referring to FIG. 5, the floats 12 in this current embodiment are constructed of molded plastic and create a tank structure with an interior volume of air. The tank structure is watertight thus providing the buoyancy force required to raise the building. The floats 12 have a predetermined float depth 42, a float height 44, and a float width 46 which determine the unit float volume dictated by the required buoyancy force to support the determined building perimeter load 40 which is designed for the dead load of the building structure plus additional live load factors due to environmental conditions.

Still referring to FIG. 5, the floats 12 are placed on the outside face 50 of the perimeter foundation wall 20. During construction, the foundation is placed after the ground 38 has been excavated to the desired interior building crawl space slab 36 elevation. Here, the perimeter foundation wall 20 is inset approximately the same distance as the float depth 42 to provide for the placement of the float 12 along the perimeter stud walls 26 and below the floor joists at the desired bearing location. The floor joists 34 cantilever out over the top of the foundation wall 20 and pick up the perimeter building load 40 from the studs 26 and roof 17. Generally speaking, the floor joists 34 usually run in one direction, so a plurality of outriggers are needed for the direction perpendicular to the floor joists to catch the non-load bearing perimeter building walls.

The floats 12 are hung from either the outriggers or the floor joists 34 by the use of non-corrosive straps 51 which keep the float tanks 12 secured to the underside of the building floor 32. During flotation, the buoyancy force within the tanks is great enough to provide for potential overturning moment especially if the center of gravity shifts providing for a moment lever arm about the connection between the floor joists and the top face of the tank 12. Thus the non-corrosive straps 51 are tightened against the tank and the floor joists 34 to resist any potential overturning due to the change in center of gravity and buoyancy force.

After the float tanks 12 are installed, the ground 38 is back filled against the outer edge of float tanks making them nearly unnoticeable.

In an alternative embodiment, float tanks 12 themselves have enough structural capacity to support the building perimeter load 40 during normal operations and the joists 34 and outriggers will not have to cantilever out over the foundation wall 20 to support the perimeter walls.

Also, the perimeter float tanks 12 have in this current embodiment, a premolded bottom plate seat 54 to accept the bottom plate 28 of the stud wall 26. Furthermore, this bottom plate seat is recessed to act as an additional water barrier during normal building usage. The current embodiment includes the tanks utilizing the previously-mentioned non-corrosive straps 51. The straps hold the tanks as previously-mentioned against the bottom flange of the floor joists 34 or the outriggers themselves. In an alternative embodiment, and to provide for a more rigid and stable connection between the float and the floor joists, the float has been premolded to include joist seats spaced at 18 inches on-center or 12 inches on-center depending on the floor design specifications. These joist seats enable the float to extend up into the block space area creating a tighter fit and a more secure connection so that the tanks 12 do not overturn during buoyancy operation.

The anchor bolts as previously discussed, keep the house from separating from the foundation. Anchor bolts provide wind and earthquake shear and moment resistance in some cases when the building experiences abnormal weather conditions. This secure anchoring to the foundation requires a foundation breakaway system of some sort to allow the building to float when floodwaters rise.

Figure 6A:
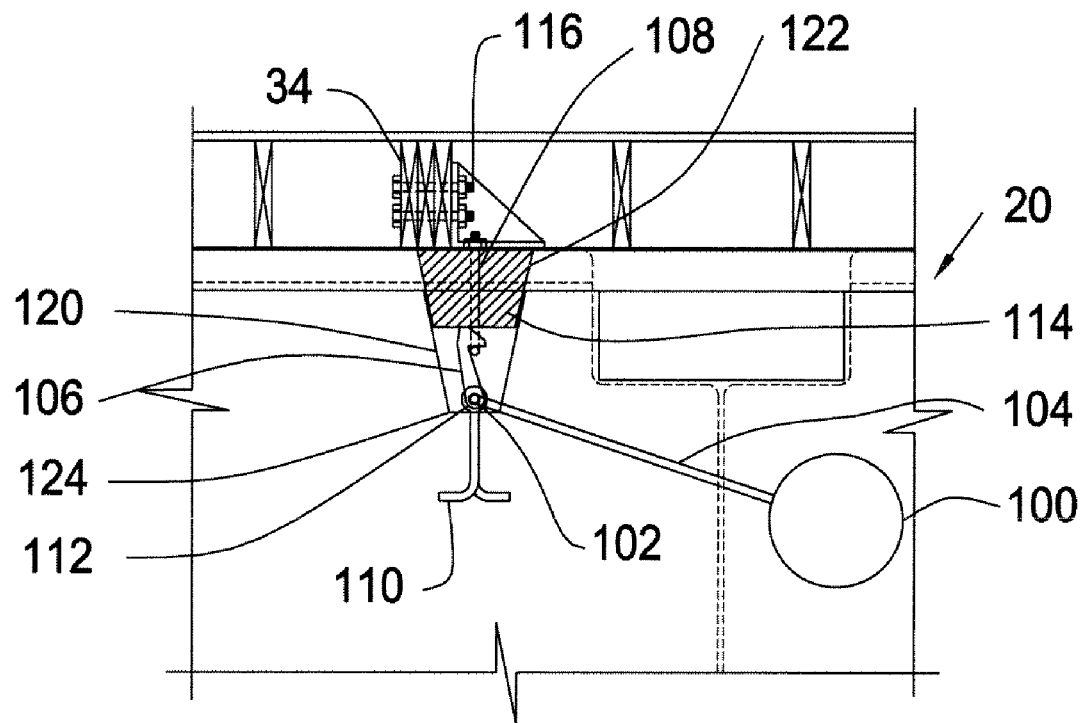
FIG. 6A is a detail section view of the release system.
Figure 6B:
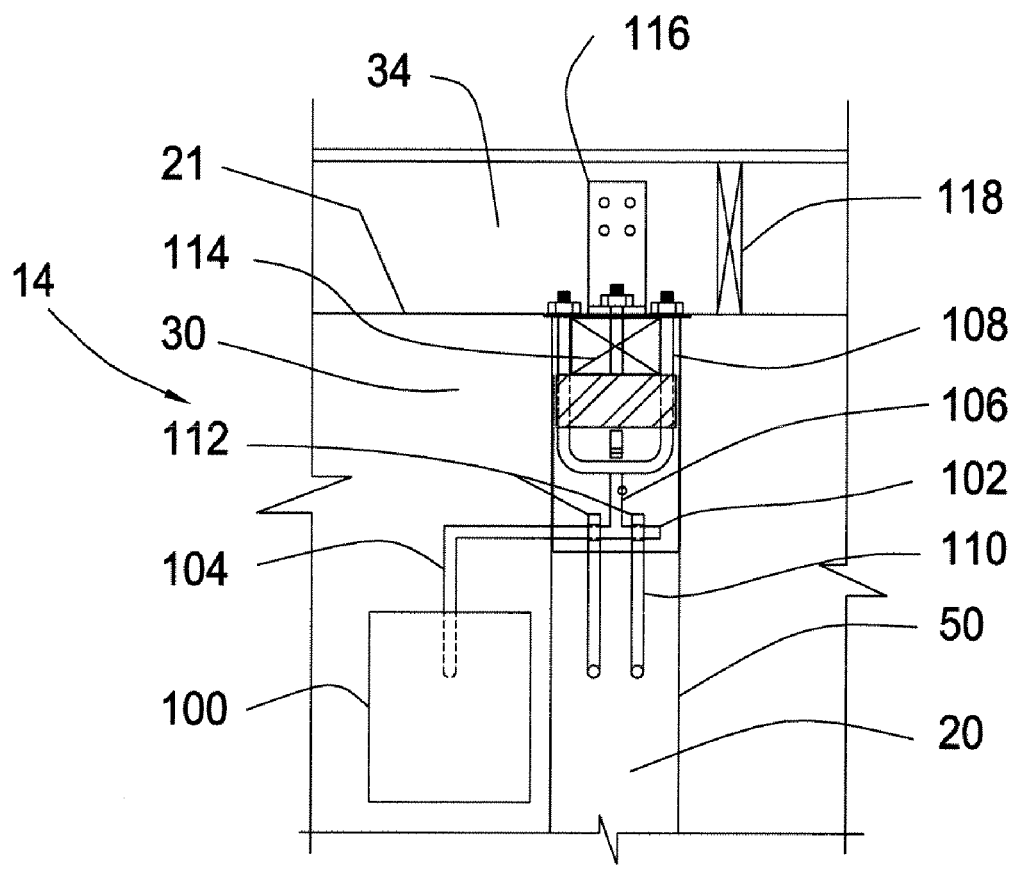
FIG. 6B is a detail section view of the release system.

Referring to FIGS. 6A and 6B, a detailed discussion of the anchor release system 14 will now be provided. As is generally utilized in common building construction practices, the anchor bolts are spaced according to local building codes along the top face of the foundation wall 20. To allow for detachment from the concrete foundation, the anchor release system 14 utilizes the following components. During forming of the concrete foundation wall 20, instead of placing standard anchor bolts, the system utilizes an anchor bolt release well 120 which has two angularly aligned side plates 122 creating a trapezoidal void within the foundation wall 20. At the bottom plate 124 of the release well 120 is, in this current embodiment, two anchor bolts 110 which extend down into the foundation wall 20 anchoring the building to the foundation. Extending out of the bottom plate 124 and into the bottom of the anchor bolt release well 120 connected to the anchor bolt tops 110 are anchor bolt eyelets 112. The anchor bolt eyelet allows a transversely aligned hinge arm 102 to be threaded through the eyelets 112 extending inwards into the crawl space 30. Rigidly attached at the crawl space end of the transversely aligned hinge arm 102 is a longitudinally aligned buoy arm 104. This buoy arm acts as a lever to rotate the transversely aligned hinge arm 102. At the cantilevered end of the longitudinally aligned buoy arm 104 is a release buoy 100.

The release buoy 100 will rise as the floodwaters within the crawl space 30 increase. This increase in water height precedes the full flotation of the perimeter floats 12; full flotation is needed to fully support the dead load of the building. Thus as the release buoys 100 rise, the transversely aligned hinge arm 102 actuates the longitudinally aligned release hook 106, detaching from the upper U anchor bolt 108. During normal building operation, the upper U anchor bolt 108 provides for the vertical force translation down through the release hook 106 and into the anchor bolts 110 embedded in the foundation wall 20. To make the connection between the upper U bolt 108 and the building sub floor structure, and to hold the upper U bolt in rigid place, a pressure-treated 4×4 114 is shaped to fit into the trapezoidal upper portion of the anchor bolt release well 120. The U bolt 108 extends through this shaped pressure-treated 4×4 114. In the case of high lateral forces such as during an earthquake event, the upper U-bolt 108 can move in the lateral direction and disconnect the anchor bolt system. Therefore the pressure-treated 4×4 block keeps the anchor U-bolts in proper vertical alignment during such an earthquake event. Attached to the top edge of the pressure-treated 4×4 114 is an anchor connection which in this case is a Simpson™ connection 116 providing for the proper force transmission through the connection during foreseeable hurricane force winds. The Simpson™ connector 116 is attached to in this embodiment a floor joist 34. The Simpson™ connector 116 has an upper leg and a lower leg; the lower leg is configured to allow for the upper U bolt 108 to extend through the lower leg thus providing the proper anchor connection as desired and engineered.

Although the above anchor release system 14 utilizes a mechanical means, other types of systems are easily envisioned. Such a system could include a water level monitoring device which is connected to a programmable logic controller which reads the level for water and then actuates a release mechanism contained within for example, the anchor bolt release wall 120 which detaches the anchor bolt release foot 106 from the U bolt 108 along the building to breakaway from the foundation.

Additionally, a utility locker containing breakaway electrical waste lines with a check valve, as well as pressure lines can be provided. This utility locker in some form is a concrete box having a height up to the top of the foundation wall. The waste line extending from the sewer lines has a junction between the house waste line and the ground waste line which includes an O-ring attaching a flexible "aquapex" conduit between the two lines. Also, the waste line has a check valve normally positioned so that effluent travels downwards and does not travel back upwards into the house waste line is a standard when power goes out to avoid sewage back flow.

The electrical line conduit extends up through the concrete box in this embodiment. To disconnect the power conduit lines from the house, a mechanical release, which is a float release mechanism similar to the previously-mentioned anchor release system 14, is utilized to disconnect the power from the ground line thus preserving the house electrical lines and avoiding potential fire hazard situations. Furthermore, detaching by a mechanical float release mechanism or system will physically detach the house electrical line from the supplied ground utility line thus avoiding ripping and tearing of the electrical lines out of the house during the vertical rise of the building.

While the floats 12 and the anchor release system 14 provide for release of the building as floodwaters rise, such a large structure on open water can cause damage if it is not well controlled by an anchoring system. During storms which might provide the floodwaters entering into the hurricane prone geographic regions, high winds between 70 mph and approaching 150-200 MPH can be experienced. These winds create a pressure against the side of the building which acts as a sail of some sort capturing wind and placing high lateral forces on the building anchor. In addition to hurricane-type scenarios, side loading can occur from flash flood situations creating a current or what FEMA refers to as a gradient, on the building which can damage the structure by washing it away. Thus the anchoring system as discussed in further detail below, is designed to handle these types of situations.

After the winds have died down, and the floodwaters recede, the anchoring system should guide the building back to its' original docked position.

Figure 4:
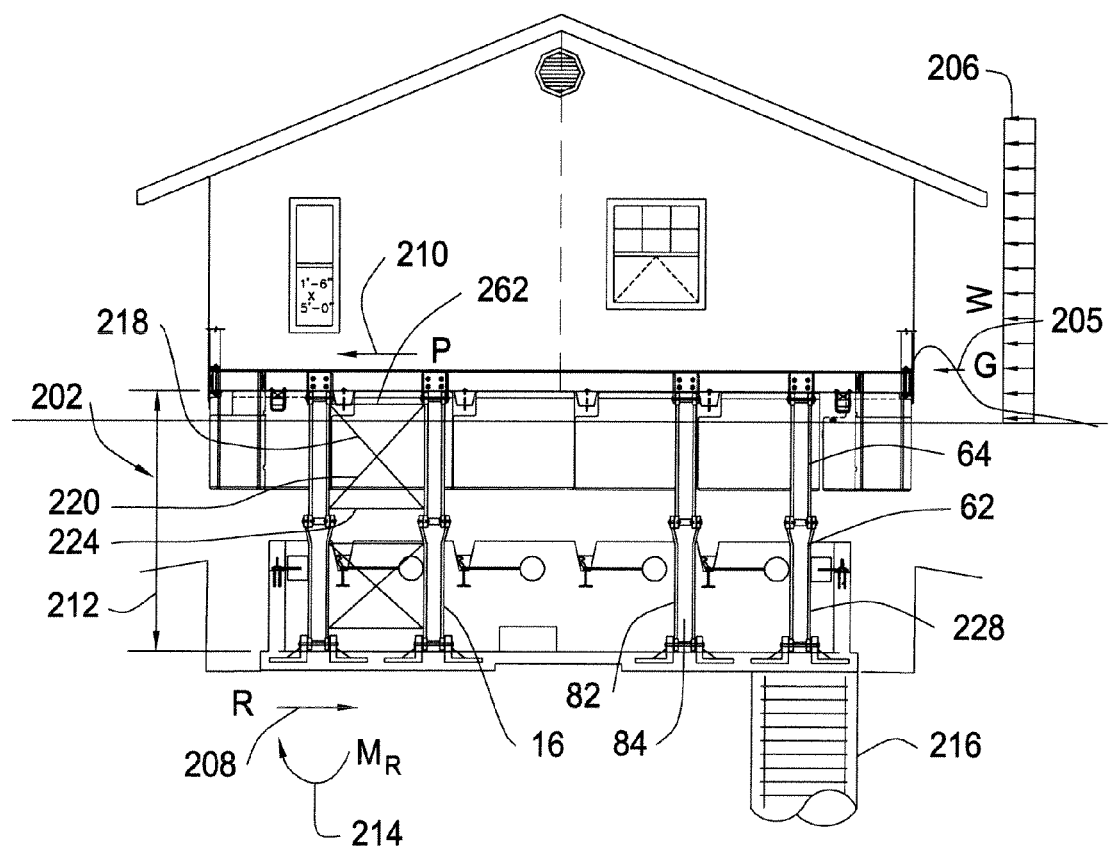
FIG. 4 is a section view the building float system in its float position.
Figure 7:
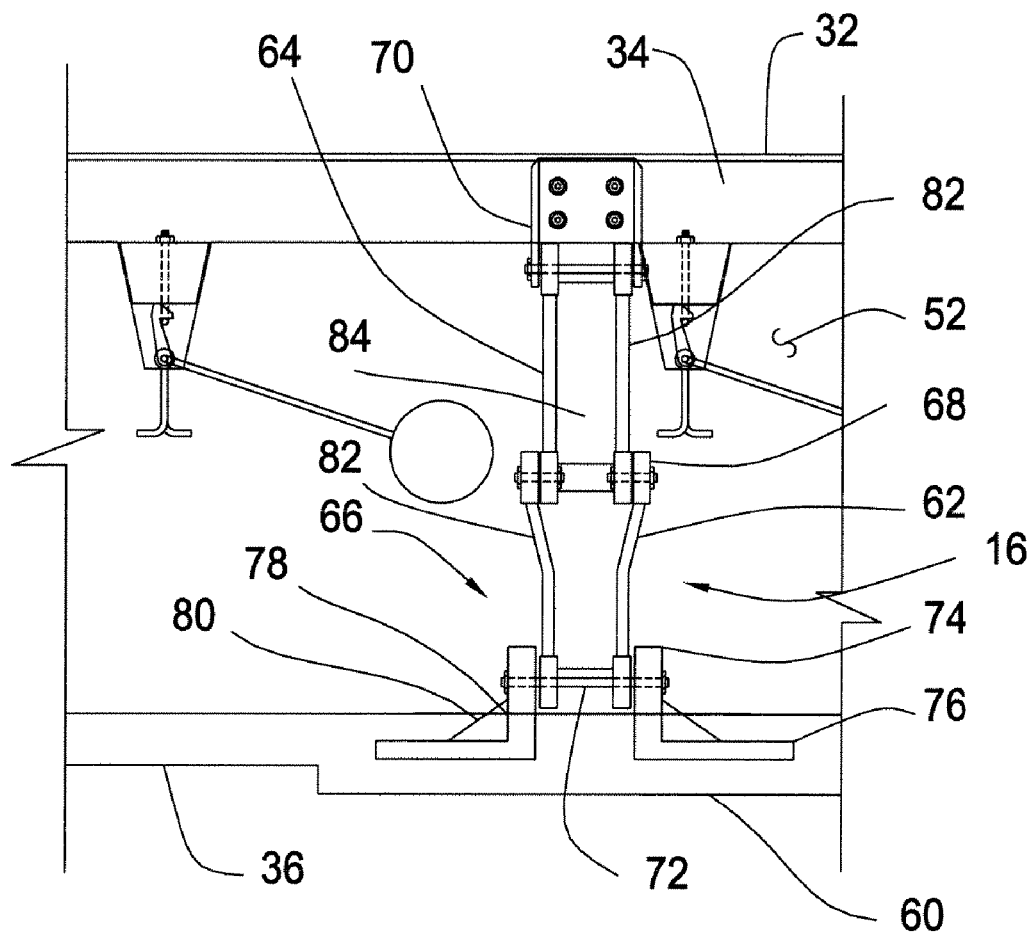
FIG. 7 is a detail section view of the anchor system.
Figure 8:
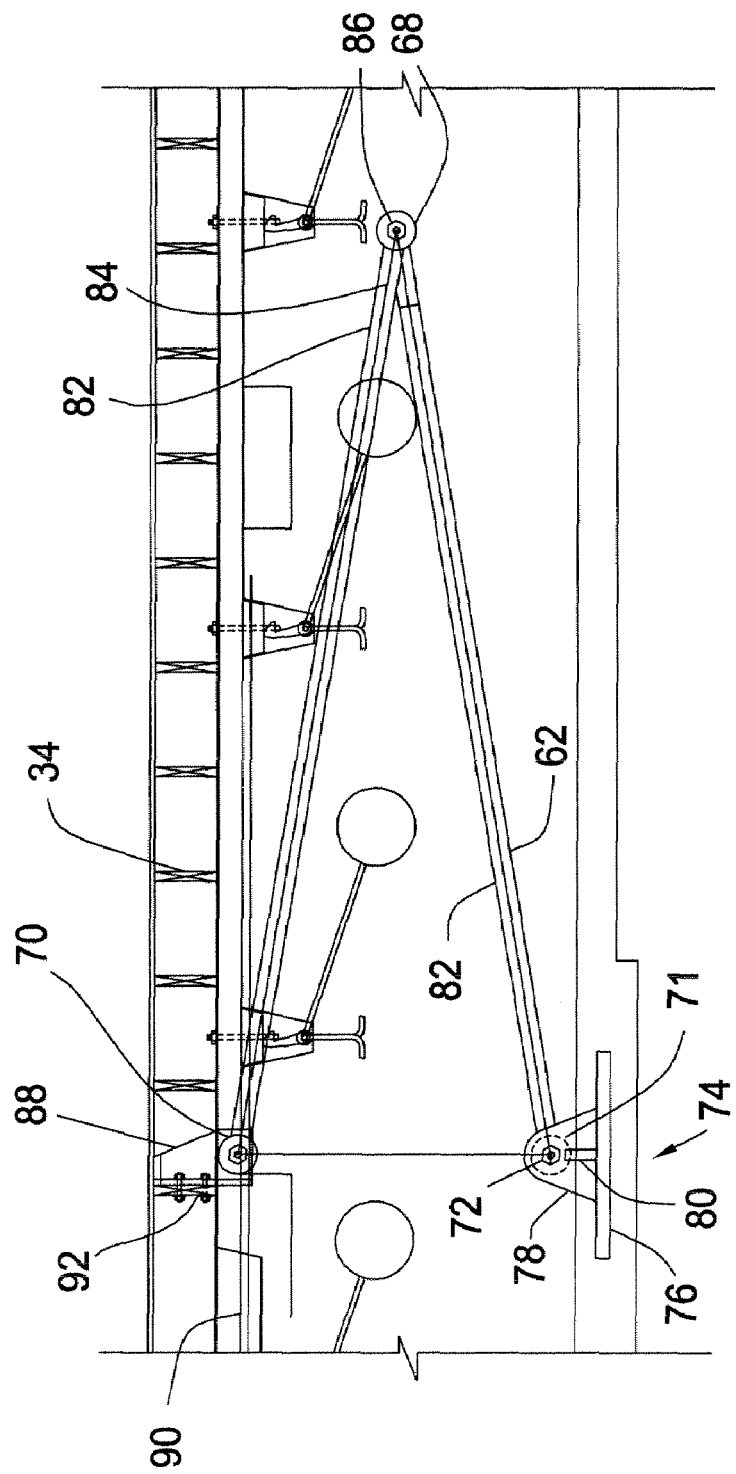
FIG. 8 is a detail section view of the anchor system.

Referring to FIGS. 7 and 8, the anchor system structural components are arranged in the crawl space 30 of the foundation 20. As seen in FIG. 4, the current embodiment provides for four floating building anchor systems 16 at each end of the building for a total of eight anchors. Each anchor system 16 as seen in FIGS. 7 and 8 has in the current embodiment a lower anchor member 62 and an upper anchor member 64. In the docked position, these anchor members are compressed vertically down towards one another and can expand open in a scissor-like or accordion-like fashion.

The anchor system is secured to the anchor foundation 60 which in this case is a strip footing but can also be provided as caisson-type footings or deeper footings as will be discussed below. The lower anchor member 62 and the upper anchor member 64 are connected by a series of joints or hinges, including a lower anchor joint 66, a mid-anchor joint 68, and in upper anchor joint 70. Essentially, each anchor member acts as an arm which is composed of two parallel longitudinally aligned outer channel flanges 82 and an inner web 84. Each anchor member or arm can be constructed out of suitable moment resisting materials, for example steel, fiberglass, or other desirable material choices. In the current embodiment, the outer channel flange 82 is a galvanized steel channel and the webbing 84 is a fiberglass material.

The lower anchor member 62 is hinged on an anchor seat 74 and a through pin 72 which the seat end of the lower anchor member 62 pivots about. Connecting the lower anchor member 62 to the upper anchor member 64 is a mid-anchor joint 68 which utilizes two interlocking joints with through pins connecting the upper and lower outer channels together.

Similarly, the upper anchor joint 70 utilizes a through pin connected to parallel upper joint gusset plates 88 and the upper portion of the upper anchor member 64.

The anchor seats 74 are founded in the anchor foundation 60; the anchor seats having a vertically arranged seat gusset plate 78 and a bottom plate seat 76. The bottom and gusset plate are joined together in one form by fillet welds at the base with a seat stiffener 80 providing for joint strengthening when moments exceed the fillet weld capacity.

The upper anchor joint 70 is connected to the upper joint gusset plates 88, which are in turn fillet welded to an upper joint back plate 90 which has a plurality of anchor bolts through holes to allow upper joint through bolt 92 to connect to the, in this case, floor joist 34. This upper anchor joint connection 70 provides for the anchor connection to the building 18.

Figure 3:
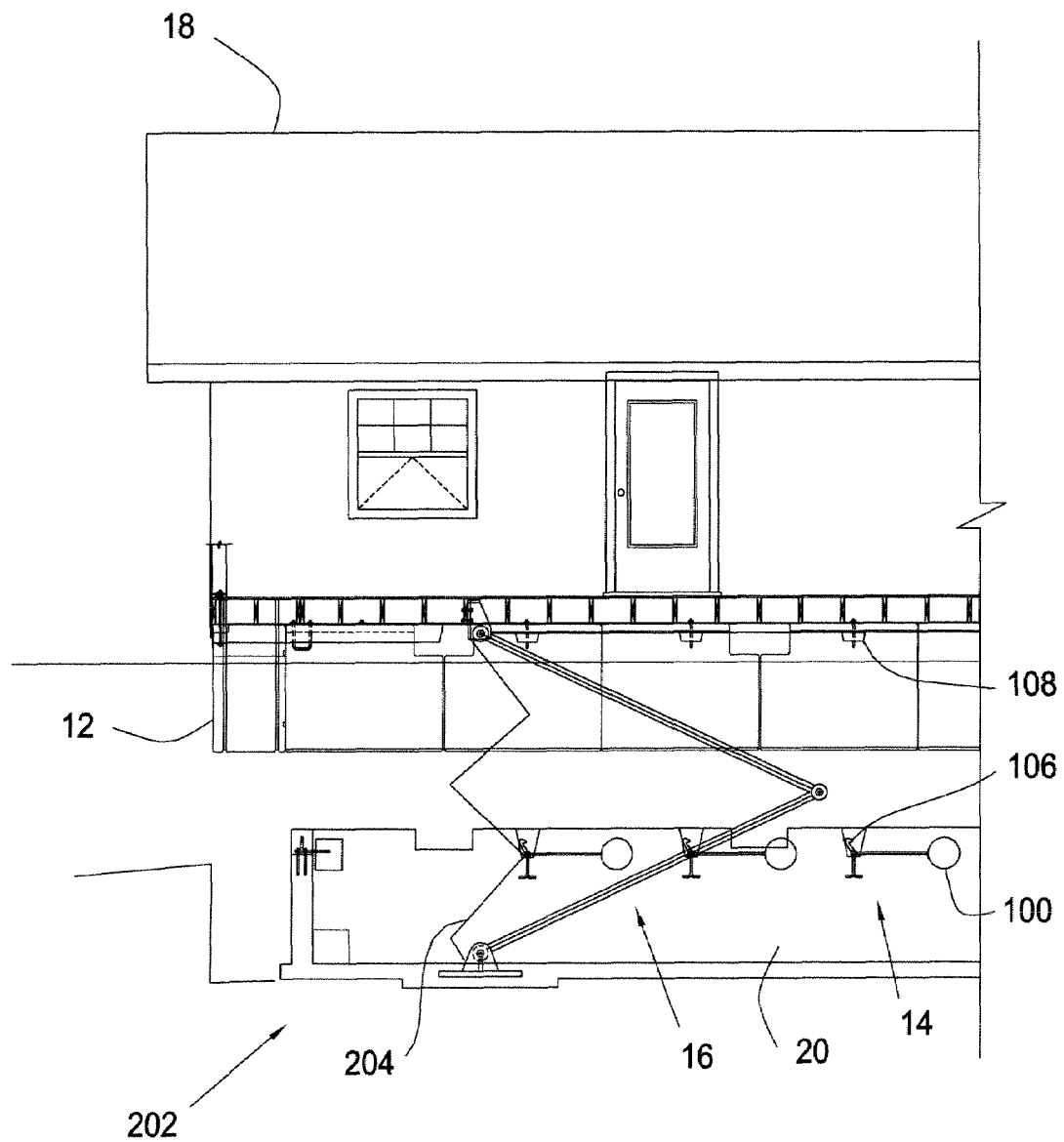
FIG. 3 is a section view of the building float system in its float position.

Referring to FIGS. 3 and 4, after the building float system 10 has left its docked position 200, as seen in FIG. 2, and has begun to float in the floating position 202, as seen in FIG. 3, the float building anchor system 16 expands in the vertical direction to guide the building 18 in the proper lateral, transverse, and vertical directions. In case the anchor system 16 fails, a tether cable 204 is provided to keep the building from floating into other objects and damaging both building and the other objects.

Referring to FIG. 4, and discussing the forces likely to be encountered during the building float system in float position 202, the wind pressure 206 provides a certain amount of variable lateral force against the side of the building 18. Assuming that the wind pressure 206 reaches approximately 60 lbs. per square foot on the face of the building 18, and taking for example that the average building height is 15 feet, with a perimeter area of 20 feet, 18,000 lbs. of lateral wind pressure or wind load 210 is applied to the four floating building anchor system 16, as seen in FIG. 4. Thus each floating building anchor system 16 would have to take approximately 4.5 kips of wind load 207 down to the foundation. Assuming that the building rises during this wind pressure 206 approximately 12 feet, the moment arm 212 would be correspondingly 12 feet high. This would create a moment about the foundation which would have to be resisted by a resultant moment 214 within the anchor foundation 60. Also in addition to the resultant moment 214, a resultant lateral force 208 would need to be provided to resist the equal but opposite wind load 210 of 4.5 kips at the top of the anchor system 16.

The total load will also include a current gradient at the base of the building structure in the direction of the current, if any current actually exists. The loads of course, may not be provided as perpendicular to the anchor frames 228, but will be resolved into longitudinal and transverse force components, taking out any torque which may occur at the top of the frames.

Thus a moment resisting frame of some sort is provided to keep the building from drifting laterally due to the wind pressure 206. In the current embodiment, as seen in FIG. 4, two such systems are provided. The first system utilizes a moment resisting foundation 216 with a rigid anchor frame 228. The rigid anchor frames 228 are designed for rigid section stiffness in the plane perpendicular to the wind load 210. At the base of the rigid anchor frame 228 a moment resisting foundation 216 is provided to keep the anchor frame 228 from pulling out of its foundation. Such a design includes a deep section with reinforcement aligned vertically to tie the previously-mentioned anchor seats 74 resisting the pullout force of the anchor seat from the moment at the base of the rigid anchor frame 228.

In the second embodiment, the moment resisting frame includes a shear truss system 218. This deepens the section depth perpendicular to the load 210 and provides essentially the same transfer of wind load 210 as shear load directly into the foundation slab 36. To accomplish this, cross bracing members 224 for the upper member area 64 and the lower member area 62 are provided. Additionally, top cords 222 and bottom cords 224 are provided to complete the truss system 218. Utilizing such a truss system lessens the need for deep foundation excavations as previously-mentioned in the first moment resisting embodiment, and adequately transfers the wind load forces 210 into the slab diaphragm and thus into the surrounding earth.

While the previous example of the current embodiment showed the anchor system below the floor joists of the existing building, the anchor system and perimeter float tanks can be placed strategically on the outside of the building perimeter to avoid complicated installation procedures for as-built conditions.

Figure 9:
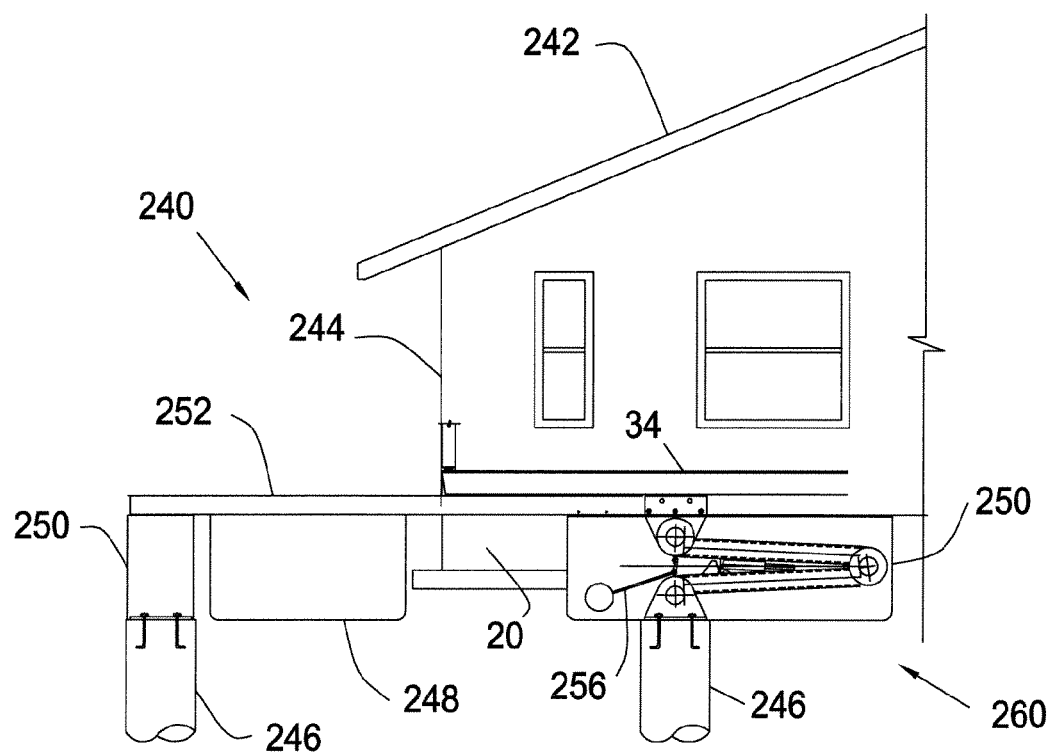
FIG. 9 is a section view of the perimeter float and anchor system.

Referring to FIG. 9, a perimeter float and anchor system 240 is shown. The existing building 242 in this particular embodiment has been raised off of its original building foundation 20. In order to do this, in some cases the anchor bolts which connect the existing building to the foundation to resist uplift have been cut so that a steel girder 252 can be threaded below the floor joists 34 of the building. The steel girder rests at strategic load support locations along the original building foundation 20 so that the existing building is adequately supported at its foundation. As can be seen in FIG. 9, the steel girders 252 are running parallel to the floor joists 34. Perpendicular to the floor joists 34 and the steel girder 252 at the ends of the existing building 242 may be outriggers extending perpendicular to reach out and provide a connection arm to the perimeter anchor system 260.

In this particular embodiment, there are four perimeter float and anchor systems 240. The perimeter float and anchor system 240 is provided at each of the main foundation supports of the existing building 242. For discussion purposes, the existing building is provided as a manufactured home. The building has a longitudinal distance of approximately 40 feet and a transverse cross-sectional length of approximately 25 feet. Spot footing supports are provided in some instances or continuous perimeter wall foundations are provided depending on the particular mobile home design. In this example, the mobile home rests on a series of spot footings having an eight-foot spacing in the longitudinal perimeter edge direction.

Figure 10:
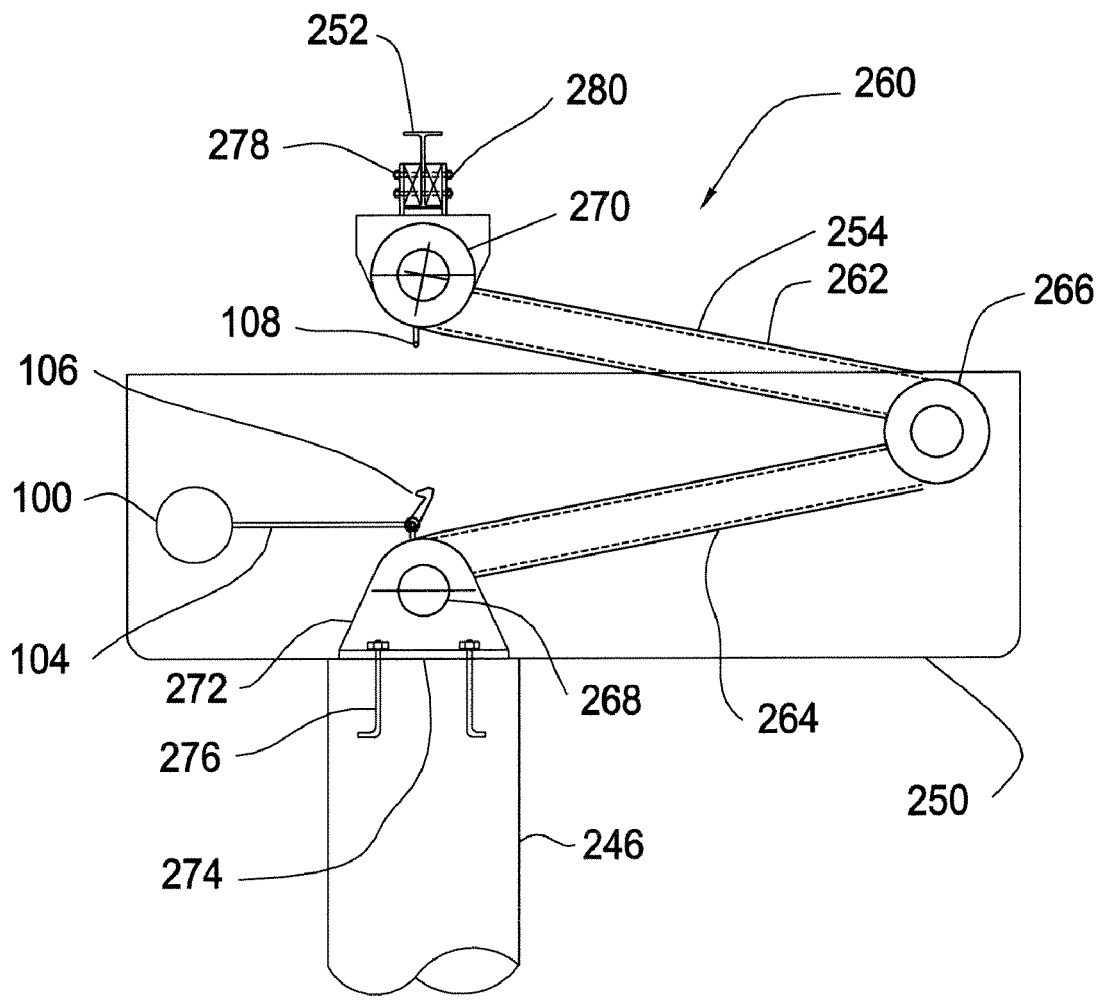
FIG. 10 is a detail view of the anchor system.

As previously mentioned, the girders 252 are placed in the transverse direction at the spot footing bearing point location of the building. Thus the members girders extend transversely out from the building perimeter edge 244 and rest on the upper gusset plate seat 278 as seen in FIG. 10 of the anchor arm 254. Matching the placement of the six steel girders 252 spaced at the eight-foot on-center foundation spacing, are six paired perimeter float and anchor systems 240.

The anchor arm 254 transfers this dead load from the existing building 242 as received from the steel girder 252 into the anchor system spot foundation drill pier 246. The float tanks 248, spaced about the perimeter of the building and connected to the steel girders 252, are inset from the perimeter anchor system 260.

In order to provide for adequate vertical translation control as well as keeping the structure in the proper longitudinal and transverse position relative to its foundation seat, the perimeter anchor system 260 in this particular embodiment has a particular range of motion and structural capacity.

Referring to FIG. 10, the spot foundation 246 is designed to support the anchor arm 254 as a portion of the dead load and live load of the building 242. As a consequence, it will be beneficial to discuss the various loading conditions which the design takes into account.

When the existing building 242 is in its original foundation seated position, the dead load and live load building rests primarily on the original building foundation 20 as previously discussed in FIG. 9.

The spot foundation 246 acts to support any load from the steel girder 252 as well as the anchor arm 254 and the perimeter float tank 248 and the anchor arm casing 250. As the water level rises and the existing building begins to float on the float tanks 240 arranged about the perimeter of the building, water load gradient as previously discussed above and wind loading will be applied for the most part in a longitudinal and transverse force resultant factor which will act as moment and shear at the lower gusset seat 272 of the anchor arm 254. The spot foundation 246 is designed to take the moment and shear loads to keep the existing building 242 in its desired position. Furthermore, prior to the float position, the existing building 242 may experience uplift from large wind loading conditions such as hurricanes and/or tornadoes and the like, so the foundation 246 as well as the release hook 106 and upper gusset plate 278 all should be adequately sized to resist any upload differential between the dead load of the existing building 242 and the uplift from high force winds.

Lastly, after the anchor arm 254 has extended to its high-level water position, which will be discussed further below, the anchor arm 254 may stay in an extended position utilizing (as seen in FIGS. 11-14) a charged hydraulic cylinder 296. As will be discussed in further detail below, this cylinder or ratchet mechanism allows the building to stay in its high-level watermark position even after the water has receded. Thus the spot foundations 246 will take the full load of the building after the water has receded.

Now discussing the release mechanism for detaching the existing building 242 from the foundation supports, when the water level begins to rise in the arm casing 250, the release buoy 100 also begins to float and actuates the buoy arm 104. This rotates the release hook 106 to detach from the release latch 108 connected to the upper hinge 270. At this point, the release buoys 100 and all of the arm anchor casings 250 distributed about the perimeter of the building have detached to allow the anchor arm 254 a vertical range of motion.

As previously discussed, the utilities are detached in a similar manner. The groundwater begins to rise starting to buoy the perimeter float tanks 248 which provide for uplift and support.

Figures 11, 12:
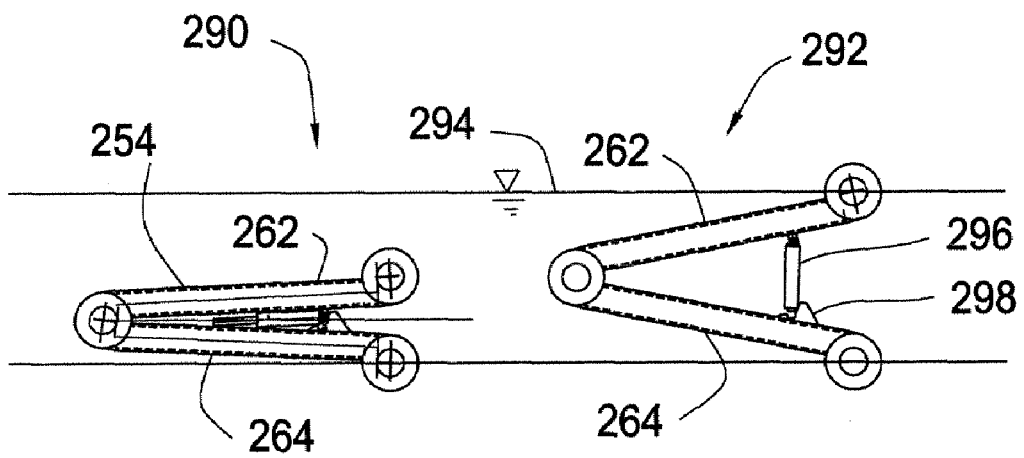
FIGS. 11-14 are detail views of the anchor arm positions.
Figures 13, 14:
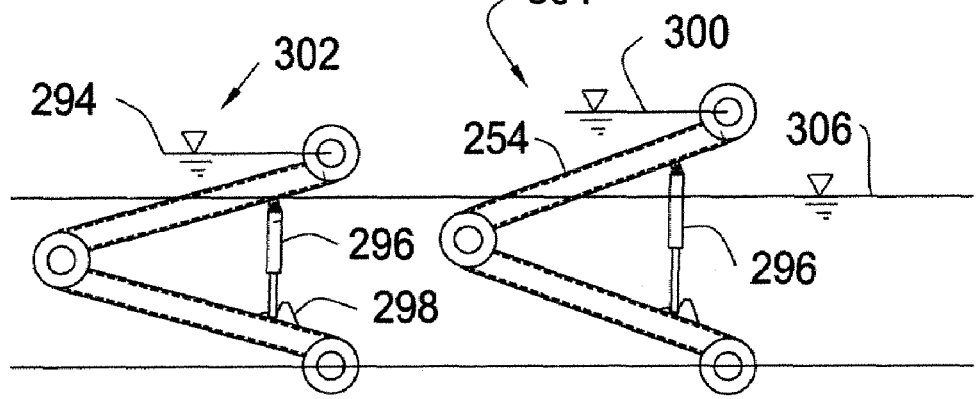

A brief discussion of the vertical translation range will now be provided through FIGS. 11-14. FIG. 11 shows the anchor arm 254 in its pre-buoyancy position 290. Here the lower arm 264 and the upper arm 262 are compressed together in the horizontal plane. As the water level 294 begins to rise, the anchor arm 254 begins a water rising buoyant position 292. As the upper and lower arms begin to separate, a charged hydraulic cylinder 296 actuates as loaded between the two arms. The charged hydraulic cylinder extends its piston to stay connected to the upper and lower arms. FIG. 13 shows the anchor arm 254 in a further extended position 302 with a higher water level 294. The charged hydraulic cylinder 296 is seated within a piston seat 298. This piston seat allows the lower piston of the charged hydraulic cylinder to seat within the lower arm 264 during the extension and compression of the hydraulic cylinder.

In an alternative embodiment, the hydraulic cylinder is already charged prior to the flooding and its lower piston is fully extended. The lower arm 264 has a longitudinally aligned upper track which sits on the upper flange of the lower arm 264. This track in one form is made of two C-sections which are aligned and welded to the top face of the flange of the lower arm 264. They are spaced transversely apart a distance so that a gap or channel opening is provided between the two upper flanges of the C-channels themselves. The lower piston of the hydraulic cylinder has a foot section with a transversely aligned hinge; the ankle portion of the foot section extends through the previously-mentioned channel gap, while the foot section itself is wider than the channel gap keeping the foot section slidably aligned within the interior region of the two channels. Locking teeth are provided on the top flange face and the lower piston foot section. When the anchor arm 254 begins to rise, the foot slides into incremental locking section positions which allow the charged hydraulic cylinder to extend and provide support to lock the anchor arm in place once the water level recedes.

Referring to FIG. 14, after the water level recedes at position 306, the anchor arm 254 in an alternative embodiment will stay at the high water mark 300 as supported by the charged hydraulic cylinder 296. This load support position 304 is maintained so that during the receding of the water 306 the driftwood and debris which will likely collect below the raised building 242 can be cleared prior to lowering of the building. A remote bleed line can be attached to each of the hydraulic cylinders 296 within each of the perimeter anchor systems 260 so that a uniform lowering of the structure after the debris has been removed can occur.

It should be noted that the section modulus and the stiffness of the lower arm and upper arm which occurs in the transverse direction or in the direction parallel to the axis of the lower hinge 268, the medial hinge 266, and the upper hinge 270, as seen in FIG. 10, provides the rigidity in the transverse direction which keeps the buoyant structure from moving in that plane, i.e. the horizontal plane in the direction perpendicular to the longitudinal axis with respect to the particular anchor arm 254. In some cases the load designed for which is applied in the horizontal direction at the location of the upper gusset plate seat 278 and the upper hinge 270 is so great that a single member section having a certain webbing distance may be unreasonable; if so two member sections located in the same plane as what is shown in the position of the upper arm 262 (as seen in FIG. 10) will be required.

Figure 15:
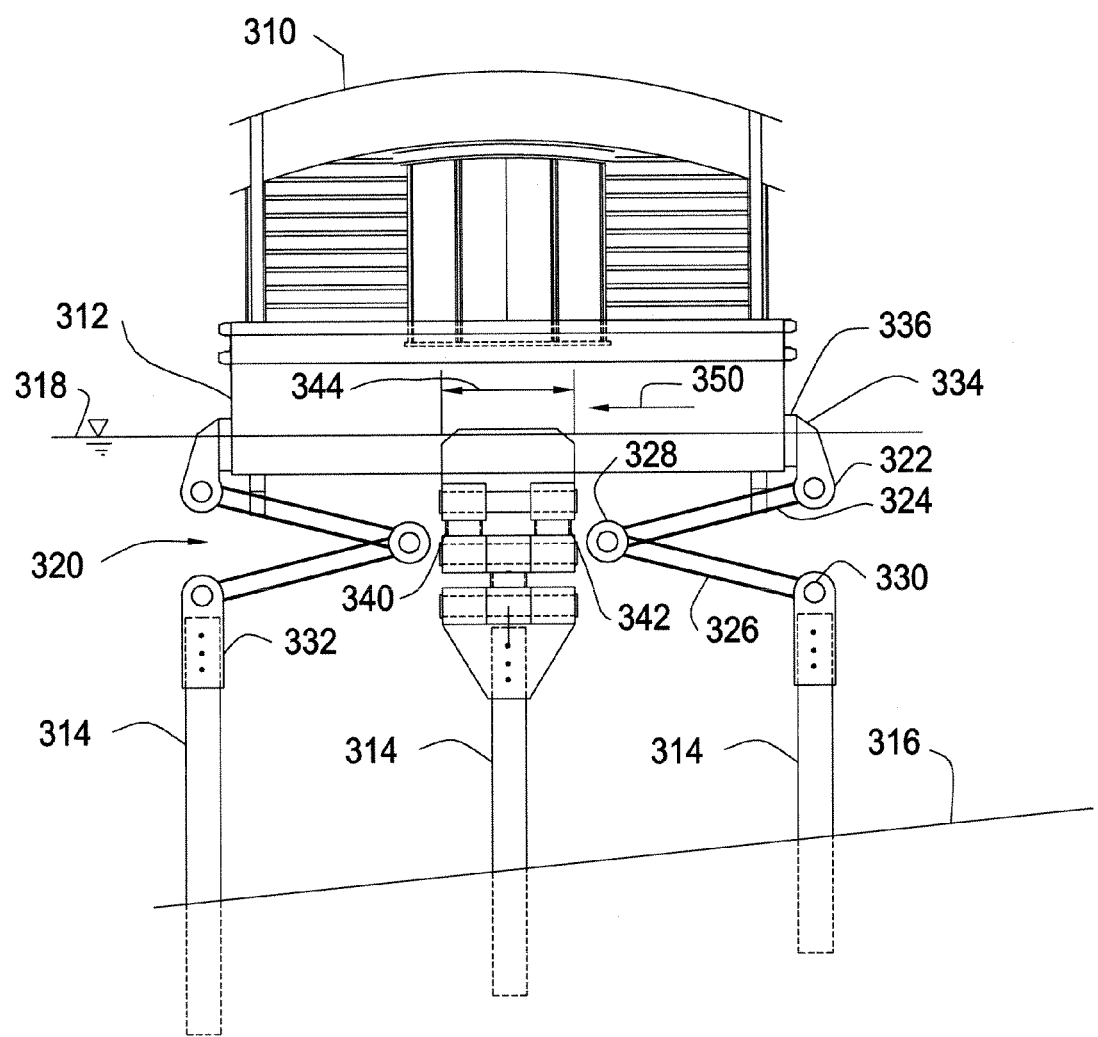
FIG. 15 is an elevational view of the anchor system connected to a house boat.

Briefly referring to FIG. 15, an example of such a configuration is shown. Here the upper arm 324 is essentially two axially aligned section members, for discussion purposes, a right axially aligned section member 340 and a left axially aligned section member 342. While the ends of the members are rigidly fixed to the upper hinge 322 and the medial hinge 328, when the force 350, for example, is applied to the upper hinge 322 the two members 340 and 342 work in tandem acting as a deeper section member having a combined axial depth 344 to resist the high loading situations.

To resolve the force components acting at an angle non-parallel with the transverse axis on the particular anchor arm 254, at least one other anchor arm 254 will be provided along a non-parallel transverse axis to the first anchor arm discussed. This provides for moment resistance and a rigid frame in the horizontal direction.

As indicated above, the anchor arm maintains the existing building 242 in its transverse and longitudinal position allowing it to travel in a vertical range of motion. The anchor arm 254 can also be used in other types of structural float situations. These situations include houseboats and floating bridges which are more or less floating in a body of water such as the ocean or lake for a permanent period of time unless the structure has been dry docked for work or storage.

Still referring to FIG. 10, the houseboat 310 has a hull 312 which has surrounding its lower portion a hull-connecting plate 336. The hull-connecting plate 336 acts as a rigid attachment and interfaces between the hull and the hull connection arm 334. The hull-connection arm 334 is pivotally attached to the upper hinge 322 of the anchor arm 320 configured for design.

A number of submerged piers 314 are placed in the submerged seabed or lake bed 360. They are capped by an anchor arm pier cap 332 which is pinned to the submerged piers and provides rotational resistance on the pier in both the circumferential direction of the vertical axis of the pier as well as the overturning moment.

I claim:

1. An anchor system for a floating structure experiencing buoyancy within a body of water, said body of water having a high level water mark and a low level water mark, said anchor system comprising:
    a. a member having a first end and a second end, said first end substantially fixed at a first position said second end substantially fixed to said structure;
    b. said member configured to allow said structure translation between said first position and a second position, said translation occurring in a substantially vertical translation range while restraining said structure in a substantially longitudinal and transverse alignment position;
    c. said member further comprising:
        i. a lower arm having a lower hinge located at said first position, said lower arm further comprising a first medial hinge configured to connect to an upper arm;
        ii. said upper arm having a second medial hinge configured to interact with said first medial hinge, said upper arm further comprising an upper hinge located at said second position;
        iii. said lower arm and said upper arm operating within said vertical translation range while retaining said structure in a substantially longitudinal and transverse alignment position.

2. An anchor system for a structure experiencing buoyancy within a body of water, said body of water having a high level water mark and a low level water mark, said anchor system comprising:
    a. a member having a first end and a second end, said first end substantially fixed at a first position said second end substantially fixed to said structure;
    b. said member configured to allow said structure translation between said first position and a second position, said translation occurring in a substantially vertical translation range while restraining said structure in a substantially longitudinal and transverse alignment position;
    c. said member further comprising an elevation locking section configured to maintain said structure at a high-level buoyancy position substantially matching said high level water mark,
    d. said member further comprising:
        i. a lower arm having a lower hinge located at said first position, said lower arm further comprising a first medial hinge configured to connect to an upper arm; and
        ii. said upper arm having a second medial hinge configured to interact with said first medial hinge, said upper arm further comprising an upper hinge located at said second position.

3. The system according to claim 2 wherein said first end is substantially fixed at said first position to a foundation element.

4. The system according to claim 2 wherein said member is further configured to resist intermittent loading applied to said structure in a substantially horizontal plane.

5. The system according to claim 4 wherein said intermittent loading is further applied to said member at said second end, said member having a section modulus large enough to resist the moment and shear forces resulting from said intermittent loading applied to said second end.

6. The system according to claim 2 wherein said structure comprises a houseboat.

7. The system according to claim 2 wherein said structure comprises a floating bridge.

8. The system according to claim 2 wherein said structure consists of one or more of the following: a mobile home, a building, a bridge, a pipeline, a pier, a water going vessel.

9. The system according to claim 3 wherein said foundation element further consists of one or more of the following: a caisson, a drilled pier, a basement wall, a strip footing, a slab on grade, a retaining wall structure.

10. The system according to claim 2 wherein said member further comprises:
   a. a lower arm having a lower hinge located at said first position, said lower arm further comprising a first medial hinge configured to connect to an upper arm;
   b. said upper arm having a second medial hinge configured to interact with said first medial hinge, said upper arm further comprising an upper hinge located at said second position;
   c. said lower arm and said upper arm operating within said vertical translation range while retaining said structure in a substantially longitudinal and transverse alignment position.

11. The system according to claim 2 wherein said elevation locking section further comprises a hydraulic cylinder having one end of said cylinder connected to said lower arm and the other end of said cylinder connected to said upper arm.

12. The system according to claim 2 wherein said elevation locking section further comprises a ratcheting lever mechanism.

13. The system according to claim 10 wherein said upper arm further comprises an upper arm transverse section depth and said lower arm further comprises a lower arm transverse section depth.

14. The system according to claim 13 wherein said upper arm and transverse section depth and said lower arm transverse section depth each have adequate section modulus in the transverse direction to resist said intermittent loading applied to said second end.

15. The system according to claim 10 wherein said member further consists of one or more of the following: a fiberglass material, a carbon fiber material, a composite material, a steel material, an aluminum material, an alloy material.

16. An anchor system for a structure experiencing buoyancy in a body of water having a high level water mark and a low level water mark, said structure experiencing intermittent loading including wind loading and water current, said anchor system comprising:
   a. a member comprising a lower arm having a lower hinge located in a first position, said lower arm further comprising a first medial hinge configured to connect to an upper arm;
   b. said upper arm having a second medial hinge configured to interact with said first medial hinge, said upper arm further comprising an upper hinge connected to said structure;
   c. said upper arm and said lower arm each having a section modulus large enough to resist a moment and shear force resulting from said intermittent loading applied to said structure and transferred to said second end, thus retaining said structure in a substantially longitudinal and transverse position relative to said first position;
   d. said member further comprising an elevation locking section comprising a hydraulic cylinder having one end of said cylinder connected to said lower arm and the other end of said cylinder connected to said upper arm said hydraulic cylinder configured to maintain said structure at a high-level buoyancy position substantially matching said high level water mark after said body of water has receded.

17. A buoyancy system for a non-buoyant structure, said non-buoyant structure experiencing periodic flooding, the flooding having a high level watermark, the non-buoyant structure having a foundation, said non-buoyant structure experiencing periodic uplift and shear on said foundation, said buoyancy system comprising:
   a. a tank comprising a volume of air, said tank configured to displace a portion of the water from said flooding with said volume of air to buoy said non-buoyant structure, said tank connected to an anchor system;
   b. said anchor system comprising: a member having a first end and a second end, said first end substantially fixed at a first position to an anchor system foundation, said second end substantially fixed to said non-buoyant structure;
   c. said member configured to allow said non-buoyant structure to be buoyed by said tank and translate between said first position and a second position, said translation occurring in a substantially vertical translation range while retaining said non-buoyant structure in a substantially longitudinal and transverse alignment position;
   d. said member further comprising an elevation locking section configured to maintain said structure at a high-level buoyancy position substantially matching said high level water mark, and;
   e. a prerelease mechanism configured to connect said non-buoyant structure to said anchor system foundation during non-periodic flooding and configured to release said non-buoyant structure from said anchor system foundation during periodic flooding.

18. The buoyancy system according to claim 17 wherein said member is further configured to resist intermittent loading applied to said structure in a substantially horizontal plane.

19. The buoyancy system according to claim 18 wherein said intermittent loading is further applied to said member at said second end, said member having a section modulus large enough to resist the moment and shear forces resulting from said intermittent loading applied to said second end.

20. The buoyancy system according to claim 17 wherein said structure consists of one or more of the following: a houseboat, a mobile home, a building, a bridge, a pier, a boat, a water going vessel.

21. The buoyancy system according to claim 17 wherein said anchor system foundation includes at least one of the following: a caisson, a drilled pier, a basement wall, a strip footing, a slab on grade, a retaining wall structure.

22. The buoyancy system according to claim 17 wherein said member further comprises:
   a. a lower arm having a lower hinge located at said first position, said lower arm further comprising a first medial hinge configured to connect to an upper arm;

b. said upper arm having a second medial hinge configured to interact with said first medial hinge, said upper arm further comprising an upper hinge located at said second position;

c. said lower arm and said upper arm operating within said vertical translation range while retaining said structure in a substantially longitudinal and transverse alignment position.

23. The buoyancy system according to claim 17 wherein said elevation locking section further comprises a hydraulic cylinder having one end of said cylinder connected to said lower arm and the other end of said cylinder connected to said upper arm.

24. The buoyancy system according to claim 17 wherein said elevation locking section further comprises a ratcheting lever mechanism.

25. The buoyancy system according to claim 22 wherein said upper arm further comprises an upper arm transverse section depth and said lower arm further comprises a lower arm transverse section depth.

26. The buoyancy system according to claim 25 wherein said upper arm and transverse section depth and said lower arm transverse section depth each have adequate section modulus in the transverse direction to resist said intermittent loading applied to said second end.

27. The buoyancy system according to claim 25 wherein said member includes at least one of the following: a fiberglass material, a carbon fiber material, a composite material, a steel material, an aluminum material, an alloy material.

28. A buoyancy system for a non-buoyant structure, said non-buoyant structure experiencing periodic flooding, the flooding having a high level watermark, the non-buoyant structure having a foundation, said non-buoyant structure experiencing periodic uplift and shear on said foundation, said buoyancy system comprising:

a. a tank comprising a volume of air, said tank configured to displace a portion of the water from said flooding with said volume of air to buoy said non-buoyant structure, said tank connected to an anchor system said anchor system having an anchor system foundation;

b. said anchor system comprising:
  i. a member comprising a lower arm having a lower hinge located in a first position, said lower arm further comprising a first medial hinge configured to connect to an upper arm; said upper arm having a second medial hinge configured to interact with said first medial hinge, said upper arm further comprising an upper hinge connected to said structure;
  ii. a prerelease mechanism configured to connect said non-buoyant structure to said anchor system foundation during non-periodic flooding and configured to release said non-buoyant structure from said anchor system foundation during periodic flooding;
  iii. said upper arm and said lower arm each having a section modulus large enough to resist a moment and shear force resulting from said intermittent loading applied to said structure and transferred to said second end, thus retaining said structure in a substantially longitudinal and transverse position relative to said first position;
  iv. said member further comprising an elevation locking section comprising a hydraulic cylinder having one end of said cylinder connected to said lower arm and the other end of said cylinder connected to said upper arm, said hydraulic cylinder configured to maintain said structure at a high-level buoyancy position substantially matching said high level water mark after said body of water has receded.

29. A buoyancy assembly for a non-buoyant structure, said non-buoyant structure experiencing periodic flooding, the flooding having a high level watermark, the non-buoyant structure having a plurality of foundation elements, said non-buoyant structure experiencing periodic uplift and shear on said foundation, said buoyancy system comprising:

a. a plurality of tank components each comprising a volume of air, said plurality of tank components configured to displace a portion of the water from said flooding with said volume of air to buoy said non-buoyant structure, said tank connected to an anchor system;

b. said anchor system comprising: a plurality of member components each having a first end and a second end, each of said first ends substantially fixed at a plurality of relative first positions in relation to a plurality of anchor system foundations, each of said second ends substantially fixed to a plurality of second positions on said non-buoyant structure;

c. said plurality of member components each configured to allow said non-buoyant structure to be buoyed by said plurality of tanks and translate between said first position and a high water position, said translation occurring in a substantially vertical translation range while retaining said non-buoyant structure in a substantially longitudinal and transverse alignment position;

d. said plurality of member components each further comprising an elevation locking section configured to maintain said structure at said high water position; and, e. a prerelease mechanism configured to connect said non-buoyant structure to said anchor system foundation during non-periodic flooding and configured to release said non-buoyant structure from said anchor system foundation during periodic flooding.

30. A buoyancy assembly for a non-buoyant structure, said non-buoyant structure experiencing periodic flooding, the flooding having a high level watermark, the non-buoyant structure having a plurality of foundation elements, said non-buoyant structure experiencing periodic uplift and shear on said foundation, said buoyancy system comprising:

a. means for displacing a portion of water from said flooding to buoy said non-buoyant structure;

b. means for anchoring said non-buoyant structure in relation to a plurality of anchor foundations;

c. means for allowing translation of said non-buoyant structure between a first position and a high water position;

d. means for restraining said non-buoyant structure in a substantially longitudinal and transverse alignment position;

e. means for locking said non-buoyant structure at said high water position; and, f. means for detaching said non-buoyant structure from said anchor foundation during periodic flooding.

31. A buoyancy process for a non-buoyant structure, said non-buoyant structure experiencing periodic flooding, the flooding having a high level watermark, the non-buoyant structure having a plurality of foundation elements, said non-buoyant structure experiencing periodic uplift and shear on said foundation, said buoyancy process comprising:

a. displacing a portion of water from said flooding to buoy said non-buoyant structure;

b. anchoring said non-buoyant structure in relation to a plurality of anchor foundations;
c. detaching said non-buoyant structure from said anchor foundation during periodic flooding;
d. allowing vertical translation of said non-buoyant structure between a first position and a high water position;
e. restraining said non-buoyant structure in a substantially longitudinal and transverse alignment position;
f. locking said non-buoyant structure at said high water position
g. wherein the step of restraining said non-buoyant structure utilizes a member further comprising:

i. a lower arm having a lower hinge located at said first position, said lower arm further comprising a first medial hinge configured to connect to an upper arm;
ii. said upper arm having a second medial hinge configured to interact with said first medial hinge, said upper arm further comprising an upper hinge located at said second position; and
iii. said lower arm and said upper arm operating within said vertical translation range while retaining said structure in a substantially longitudinal and transverse alignment position.

\* \* \* \* \*